(12) United States Patent
Kemnitz et al.

(10) Patent No.: US 10,284,068 B2
(45) Date of Patent: May 7, 2019

(54) LINEAR ACTUATOR

(71) Applicant: Rausch & Pausch GmbH, Selb (DE)

(72) Inventors: Rocco Kemnitz, Bobenneukirchen (DE); Werner Döhla, Gefrees (DE); Julius Hudec, As (CZ); Jakob Haas, Selb (DE)

(73) Assignee: Rausch & Pausch GmbH, Selb (DE)

( * ) Notice: Subject to any disclaimer, the term of this patent is extended or adjusted under 35 U.S.C. 154(b) by 824 days.

(21) Appl. No.: 14/766,606

(22) PCT Filed: Feb. 10, 2014

(86) PCT No.: PCT/EP2014/052566
§ 371 (c)(1),
(2) Date: Aug. 7, 2015

(87) PCT Pub. No.: WO2014/122312
PCT Pub. Date: Aug. 14, 2014

(65) Prior Publication Data
US 2016/0006333 A1 Jan. 7, 2016

(30) Foreign Application Priority Data
Feb. 11, 2013 (DE) .................. 10 2013 202 166

(51) Int. Cl.
*H02K 41/02* (2006.01)
*H02K 33/16* (2006.01)
(Continued)

(52) U.S. Cl.
CPC ........... *H02K 41/02* (2013.01); *B60K 5/1283* (2013.01); *F16C 32/0472* (2013.01);
(Continued)

(58) Field of Classification Search
CPC .......... F16F 13/00; F16F 13/149; F16F 13/26; F16F 5/00; H01F 2007/086; H01F 7/081;
(Continued)

(56) References Cited

U.S. PATENT DOCUMENTS 2,435,817 A  2/1948 Boynton et al.
6,509,661 B1 * 1/2003 Kujira .................... H02K 5/225
                                                              310/71

(Continued)

FOREIGN PATENT DOCUMENTS

DE          3626254 A1   2/1988
DE  10 2005 011629 A1   9/2006
(Continued)

OTHER PUBLICATIONS

Kubo, Takeharu, English Machine Translation of JP 11089147 A, Mar. 1999.*
(Continued)

Primary Examiner — Bernard Rojas
Assistant Examiner — Rashad H Johnson
(74) Attorney, Agent, or Firm — Maier & Maier, PLLC

(57) ABSTRACT

A linear actuator for an active engine mount of a vehicle has a stator with a coil that can be fed with electric current for generating an electromagnetic field and an actuating element that is mounted in axially movable fashion with reference to the stator. The actuating element comprises an armature and a ram extending in axial direction and is so mounted in the stator by means of at least one spring element that it can be moved axially in frictionless fashion when the coil is fed with current. The actuating element comprises a support element of a non-magnetic light-weight construction material extending in radial direction between the armature and the ram. Advantageously, the armature is provided only in
(Continued)

Figure 1:
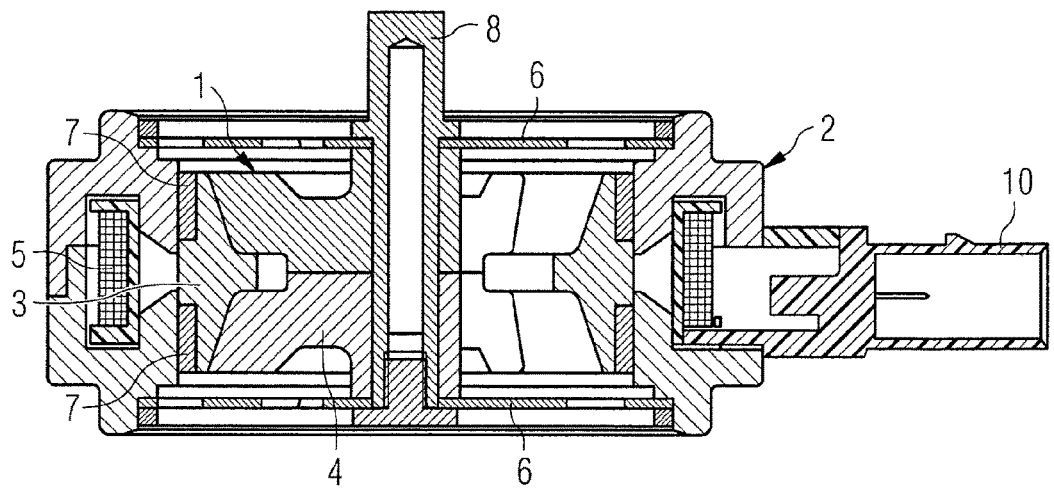

such regions where there run magnetically relevant field lines of the electromagnetic field of the coil.

15 Claims, 3 Drawing Sheets

(51) Int. Cl.
| | |
|---|---|
| H02K 1/30 | (2006.01) |
| F16C 32/04 | (2006.01) |
| B60K 5/12 | (2006.01) |
| H01F 7/16 | (2006.01) |
| F16F 13/26 | (2006.01) |
| F16F 13/00 | (2006.01) |
| F16F 13/14 | (2006.01) |
| F16F 5/00 | (2006.01) |
| H01F 7/08 | (2006.01) |

(52) U.S. Cl.
CPC ............ *H01F 7/1607* (2013.01); *H02K 1/30* (2013.01); *H02K 33/16* (2013.01); *F16C 32/0468* (2013.01); *F16F 5/00* (2013.01); *F16F 13/00* (2013.01); *F16F 13/149* (2013.01); *F16F 13/26* (2013.01); *H01F 2007/086* (2013.01)

(58) Field of Classification Search
CPC ........ H01F 7/1615; H02K 1/30; H02K 33/16; H02K 41/02; F16C 32/0468; F16C 32/0472
USPC ................. 310/12.16, 12.24, 15, 21, 25, 32, 310/216.053, 221
See application file for complete search history.

(56) References Cited

U.S. PATENT DOCUMENTS

| | | | | |
|---|---|---|---|---|
| 2002/0036372 | A1* | 3/2002 | Goto ...................... | F16F 7/1011 267/140.14 |
| 2002/0053764 | A1* | 5/2002 | Goto ...................... | F16F 13/264 267/140.14 |
| 2005/0035673 | A1* | 2/2005 | Lafontaine ............. | H02K 1/187 310/58 |
| 2007/0138719 | A1* | 6/2007 | Ichikawa ............... | F16F 13/268 267/140.14 |
| 2009/0079118 | A1* | 3/2009 | Muraoka ................. | F16F 13/26 267/140.14 |
| 2010/0127581 | A1* | 5/2010 | Yun ......................... | B06B 1/045 310/25 |
| 2011/0101582 | A1* | 5/2011 | Kanaya ................... | F16F 13/18 267/140.14 |
| 2011/0180980 | A1 | 7/2011 | Urayama et al. | |
| 2012/0200021 | A1* | 8/2012 | Kanaya ................. | F16F 13/108 267/140.14 |

FOREIGN PATENT DOCUMENTS

| | | |
|---|---|---|
| DE | 112006002553 T5 | 8/2008 |
| EP | 0 100 436 A1 | 2/1984 |
| EP | 0 181 056 A1 | 5/1986 |
| JP | 11089147 A * | 3/1999 |

OTHER PUBLICATIONS

German Office Action dated Dec. 16, 2013, in connection with corresponding DE Application No. 10 2013 202 166.6 (4 pgs.).
International Search Report dated May 21, 2014 from corresponding International Application No. PCT/EP2014/052566; 3 pgs.

* cited by examiner

LINEAR ACTUATOR

The present invention relates to a linear actuator, in particular for utilization in an active engine mount of a vehicle.

In vehicles, so-called active engine mounts can be used to improve comfort. By means of an active engine mount, undesirable vibrations and a noise transmission to the interior of the vehicle caused thereby can be suppressed or at least reduced. Undesirable vibrations can occur for example upon a cylinder turn-off of the engine, when one or several of the cylinders of the engine are turned off, wherein the engine can run out of round. For this purpose, an active engine mount has a control for one or several actuators in order to counteract the vibrations of the engine by means of the actuators in the fashion known to the person skilled in the art.

The actuators can be linear actuators in particular, which are operated electromagnetically. A linear actuator usually has a stator with a coil that can be fed with electric current for generating an electromagnetic field, as well as an actuating element with an armature that is axially movably mounted with reference to the stator. The actuating element moreover has a ram extending in axial direction for actuating the active engine mount. It is advantageous to so mount the actuating element in the stator for example by means of a spring element that it can be moved axially in frictionless fashion.

When the linear actuator is activated for vibration suppression of the engine, high frequencies can occur at which the actuating element is moved. It is the object of the present invention to make available a linear actuator, in particular for an active engine mount, which has a good behavior also upon vibrations at high frequency.

This object is achieved by a linear actuator having the features of the independent claim. Developments and preferred embodiments are stated in the dependent claims.

According to the invention, the actuating element has a support element extending in radial direction between the armature and the ram. The support element consists of a non-magnetic material of a lower density than the armature. The armature consequently does not reach up to the ram, but is supported by a support element that can be configured in advantageous light-weight mode of construction. In this fashion, the weight of the actuating element can be reduced, which has a positive influence on the behavior of the linear actuator also upon vibrations at high frequency. By the reduced inertia of the actuating element the activation behavior is improved, since in particular upon reversing the current feed of the coil the reversal error of the actuating element is reduced.

The invention is based on the finding that the spatial extension of the armature, which consists of a relatively heavy magnetic material, can be reduced without this having a substantial influence on the magnetic force acting on the armature. Therefore the portion of the actuating element that is disposed radially inside can be replaced by a non-magnetic, lighter material. For it has unexpectedly been found that almost no field lines of the electromagnetic field of the coil run in this region. This means that in this region at most an irregular stray flux of the magnetic field occurs, which does not have an influence on the magnetic force, however. The relevant field lines run in a closed circle in the ferro-magnetic circuit of the linear actuator, in particular through the armature.

By this division of the actuating element into the magnetically relevant armature and the magnetically irrelevant support, thus a weight minimization is achieved while the magnetic function remains unrestricted at the same time. Particularly in actuators operated or excited at high frequencies, this property is very advantageous, since the resonance frequency of the linear actuator is as high as possible for this reason.

Preferably, the armature and the support element are therefore so dimensioned that an enlargement of the armature in radial direction would not result in an enlargement or at least substantially no enlargement towards the inside, for example an enlargement by maximally 5%, of the magnetic force that is generated by the electromagnetic field during operation and acting on the actuating element. In different words, the spatial extension and the mass of the armature are reduced to a minimum with a predetermined configuration of the stator and a predetermined current intensity fed to the coil. It is not necessary to enlarge the armature radially towards the inside, in the direction of the ram and to correspondingly reduce the size of the support element, since, as explained, no relevant field lines of the electromagnetic field run in this region. The relevant field lines run through the armature. The armature is thus reduced to its magnetically relevant volume. However, a further reduction in size of the armature would lead to a reduction of the magnetic field and a negative influence on the field lines, which would result in a decrease of the magnetic force.

In a preferred embodiment of the invention the armature is of annular configuration and surrounds the support element. The armature thus assumes that part of the actuating element which is adjacent to the coil and is therefore particularly relevant for the effect of the magnetic field. Advantageously, the annular armature is configured to be as narrow as possible, wherein the ratio of the outer diameter of the armature to the inner diameter of the armature amounts at most to 2:1, preferably at most 1.5:1 and further preferably at most 1.25:1. With reference to the total diameter of the actuating element, the armature consequently takes up at most one half, further preferably at most one third and even more preferably at most one fifth.

The cross section of the armature is preferably tapered towards the inside in axial direction. For it has been found that also the shape of the cross section of the armature can be used to reduce the volume of the armature without negatively influencing the force balance of the magnetic force in so doing. In particular, the cross section of the armature can be reduced from radially inside, wherein the field lines of the electromagnetic field are not disturbed. For example, in comparison to a rectangular cross section, one or two corners can be omitted from radially inside, such that for example a roughly trapezoidal cross section is created. Other radially inwardly tapered forms of cross section are likewise possible, such as for example a trapezoidal shape with rounded corners, a round shape or also a concave shape, as long as the extension of the field lines through the armature is not impeded thereby.

To reduce the weight of the actuating element it is advantageous when the support element comprises a light-weight construction material or substantially consists thereof completely, such as for example aluminum, magnesium, plastic and/or a fiber composite.

The actuating element can comprise at least one permanent magnet that adjoins the armature and is preferably arranged on the outer circumference of the armature. In a preferred embodiment two permanent magnets can be provided which are spaced apart in axial direction and preferably magnetized in radial direction. The permanent magnets are important particularly when the ferro-magnetic circuit of the linear actuator does not comprise a static pole part or a movement direction of the actuating element is desired in dependence of the polarity of the exciting current. The axial displacement of the actuating element is then caused by the magnetic force of the magnetic field acting on the armature, with the magnetic field composed of the electromagnetic field of the current-fed coil and the magnetic field of the permanent magnets.

Advantageously, the support element has openings and can preferably be dimensioned smaller than the armature in axial direction at least regionally. The support element can also have recesses in order to safe weight. These measures serve to further reduce the volume and thereby the mass of the support element. The dimension, the arrangement, the configuration and the shape of the openings and/or recesses in the support element depend in particular on the utilized material of the support element and also the magnetic forces depending on the application, namely in such a fashion that the mechanical stability of the support element is not adversely affected. The openings can be of any desired shape and extend in axial direction. It is also possible not to provide openings which penetrate the support element completely, but to form merely recesses on one or both axial sides of the support element.

In a preferred embodiment the support element can have a part disposed radially outside that supports the armature and a part disposed radially inside that supports the ram, with the parts being mutually connected via spoke-like bars. For example the support element can be configured like a rim and the armature can sit on the outer circumference of the support element. The support element can comprise at least one deep-drawn part, permitting a particularly simple and cost-effective manufacture.

As already explained at the outset, the actuating element is so mounted in the stator by means of at least one spring element that it can be moved axially in frictionless fashion when the coil is fed with current. Preferably, the actuating element is so coupled with the stator on opposing axial sides of the armature respectively via at least one spring element that the actuating element is oriented radially with reference to the stator by means of the spring elements. The at least one spring element for radial orientation is advantageously the same spring element that serves for frictionless mounting. In addition to the mounting function, the spring elements can exert defined return forces on the actuating element, such that by suitably choosing the spring geometry and the spring thickness, the stiffness of the linear actuator can be adjusted without additional compression springs being necessary for example. Preferably, spring elements are used that are flat in a stress-free state and extend in a plane perpendicular to the movement direction of the armature. The spring elements can be detached, preferably punched out, from a sheet-shaped material and can thus be manufactured in simple and cost-effective fashion as out-of-tool parts, for example cut parts. Manufacture by laser cutting or by etching is likewise possible.

The frictionless mounting of the actuating element has the advantage that no friction forces occur and thereby mechanical stress on the actuating element is prevented. Further no hysteresis is caused by friction, such that merely a magnetic hysteresis remains. Through the lack of friction the response of the linear actuator is improved, i.e. upon changing the guiding signal, in particular a reversal of the electric current, a change of the actuating signal is effected without delay, i.e. of the generated force or of the path covered by the actuating element. In characteristics, this behavior can be recognized by a sharp turn of the output signal upon reversal of the guiding signal. Thus dead times at the reversal points are prevented.

The linear actuator is preferably utilized in an engine mount for an engine of a vehicle in order to counteract vibrations of the engine mount. For this purpose a control is provided for the linear actuator which controls the linear actuator in suitable fashion. In particular, it is possible thereby to reduce the vibration transmission from the engine to the chassis of the vehicle, which can occur for example upon turning off a cylinder of the engine. The engine mount can comprise a volume filled with oil on which the engine is mounted. The ram of the linear actuator is coupled to a membrane adjoining the oil volume, so that the oil volume can be excited at a frequency captured by a sensor in order to dampen the vibrations of the engine by the corresponding vibrations of the oil volume.

Figure 2A:
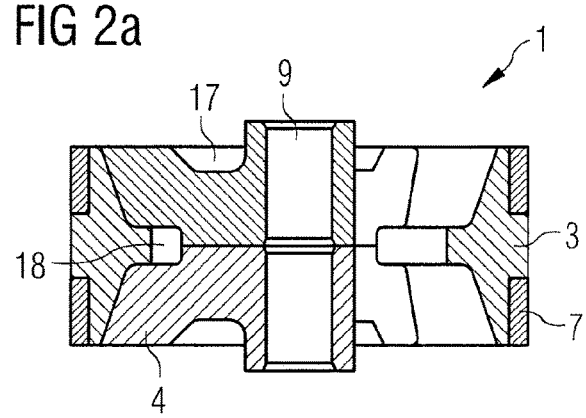
Figure 2B:
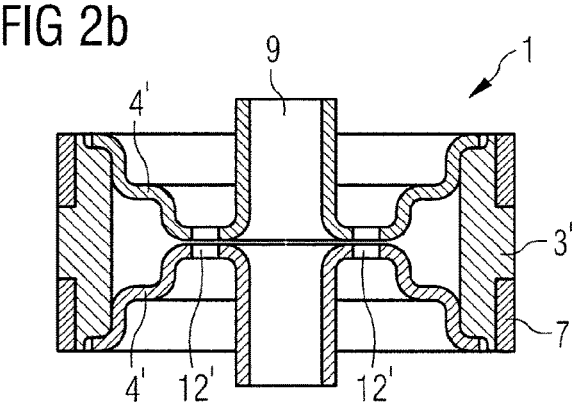
Figure 3:
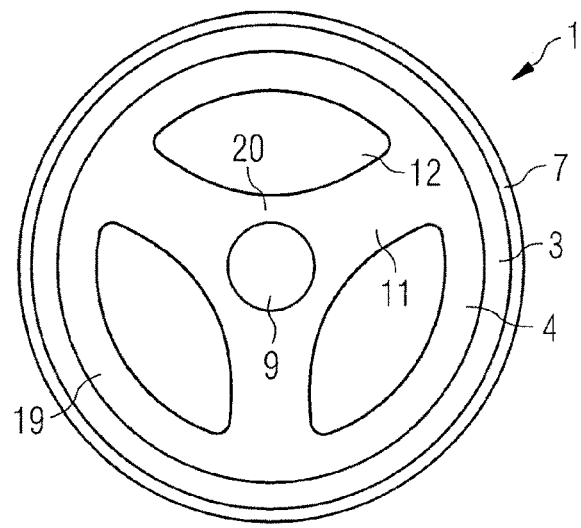
Figure 4:
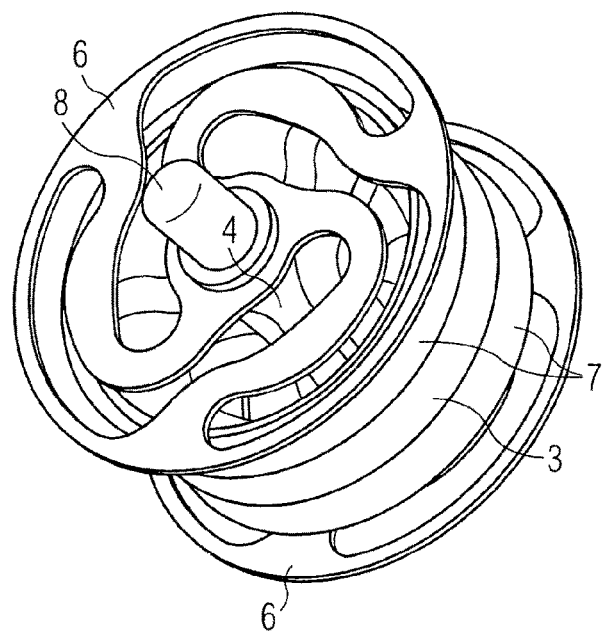
Figure 5:
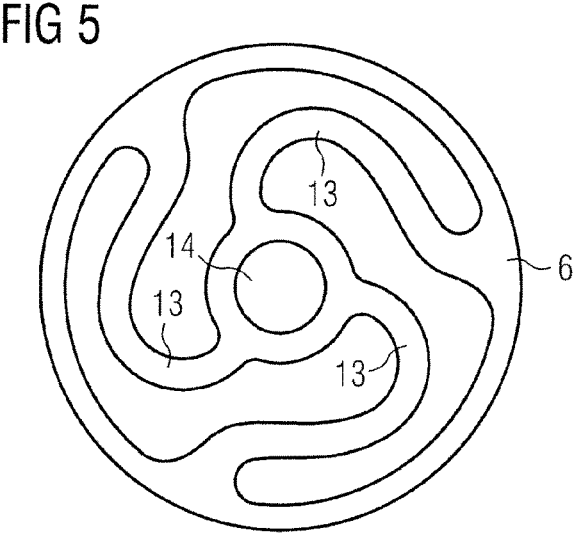
Figure 6:
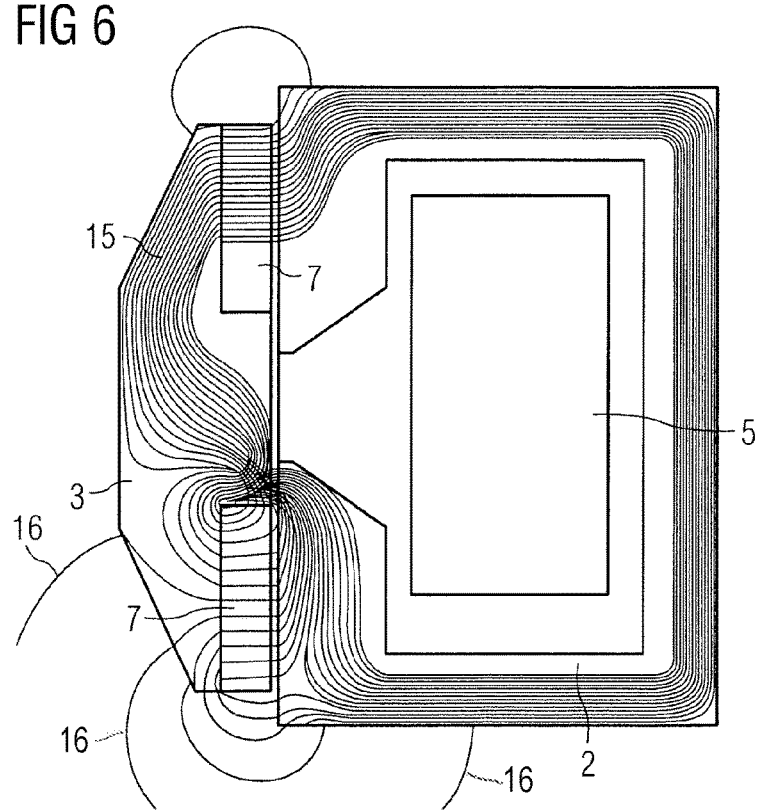

The invention will hereinafter be described by way of example with reference to the accompanying schematic drawings. The figures are described as follows:

FIG. 1 a linear actuator in a sectional view,

FIG. 2a the actuating element of the linear actuator of FIG. 1 without the ram in a sectional view, FIG. 2b a different exemplary embodiment of an actuating element (without ram), FIG. 3 the actuating element of the linear actuator of FIG. 1 without the ram in a plan view, FIG. 4 the actuating element of the linear actuator of FIG. 1 together with the spring elements in a perspective view, FIG. 5 a spring element in a plan view and FIG. 6 schematically the path of the field lines of the electromagnetic field.

FIG. 1 shows a linear actuator for an active engine mount of a vehicle. The linear actuator has a stationary stator 2 comprising a coil 5 that can be fed with electric current. Further, an electrical connector 10 is provided via which the linear actuator is supplied with current. In the stator 2 an actuating element 1 with a ram 8 is mounted in axially movable and radially oriented fashion via two spring elements 6. The spring elements 6 are so configured that the actuating element 1 is mounted in frictionless fashion. This means that between the stator 2 and the actuating element 3 there is preferably an air gap which is maintained by the mounting of the actuating element 1 by means of the spring element 6 also during the axial movement of the actuating element 1. One of the spring elements 6 is represented in a plan view in FIG. 5. The spring element 6 is of substantially flat configuration and has curved, here substantially S-shaped, spring legs 13, which provide for the radial orientation of the actuating element 1. The radial stiffness of the spring element 6 is high in comparison to its axial stiffness, such that the radial orientation is ensured also upon an axial movement. By utilizing such spring elements 6, additional compression springs for returning the actuating element 1 can be omitted, since the spring elements 6 serve not only to mount, but also to return the actuating element 1 to its start position.

The actuating element 1 comprises an armature 3 and a support element 4 arranged between the armature 3 and the ram 8. The ram 8 is inserted in a bore 9 (see FIGS. 2a, 3) of the support element 4, but can also be configured as an integral component with the support element 4. By feeding the coil 5 with current, the actuating element 1 is displaced in axial direction against the axially acting forces of the spring elements 6. The ram 8 herein serves to connect the linear actuator to surrounding components of the engine mount. Since the linear actuator does not have a firm pole part, two permanent magnets 7 are provided which are disposed radially outside, such that by generating an electromagnetic field by the coil 5 and the magnetization of the armature 3 resulting therefrom a magnetic force in axial direction is generated. The required magnetic force for displacing the actuating element 1 is effected by interaction of the electromagnetically generated magnetic force and the magnetic force of the permanent magnets 7. The arrangement of the permanent magnets 7 in recesses of the armature 3 further permits a compact type of construction.

The linear actuator is provided to influence other components of the engine mount by displacement of the ram 8 such that vibrations of the engine of the vehicle are counteracted immediately, in order for them not to be transmitted to other chassis parts and to the interior of the vehicle. For this purpose the linear actuator is dynamically excited by a frequency ascertained by a control. For example the ram is coupled to a membrane limiting an oil volume on which the engine is mounted and which is excited correspondingly by means of the linear actuator to dampen vibration. By polar reversal of the coil 5 a reversal of the magnetic force takes place, and accordingly a reversal of the movement direction of the actuating element 1. Additionally, a movement reversal is supported by the return force of the spring elements 6. In FIG. 4 the arrangement of the actuating element 1 with the spring elements 6 is represented. It is also possible to provide more than two or only one such spring element. The ram 8 is inserted in the bore 9 of the support element 4 and projects through a central opening 14 of the spring elements 6.

When the linear actuator is applied in an active engine mount high frequencies occur at which the linear actuator vibrates. By the solution of the invention, the mass of the actuating element 1 is kept small, so that the resonance frequency of the actuating element 1 is heightened and inertia effects are reduced. Accordingly, the mass of the armature 3 is reduced to a minimum and the support element 4 is manufactured of a light-weight construction material, such as aluminum, magnesium, plastic or a fiber composite, in particular a material of a lower density than the material of the armature 3.

As represented in FIG. 6, in the region disposed radially inside almost no relevant field lines of the electromagnetic field occur, such that this region is not relevant for the force balance. Merely an irregular stray flux 16 exits from the magnetic circuit, which is not relevant for the force balance. It is sufficient to provide the armature 3 only in the region that is relevant for the force balance, i.e. in that region of the actuating element 1 that is penetrated by the relevant field lines 15. When the configuration of the stator 2 and the current intensity are predetermined, an enlargement of the armature 3 towards the radial inside does not or substantially not yield an increase of the force, for example maximally 5%. For this reason the heavy magnetic material of the armature 3 can be replaced here by a non-magnetic light-weight construction material of the support element 4. The armature 3 can have a cross-section shape that is tapered towards radially inside, as long as the relevant field lines 15 extend substantially within the armature 3, as can be seen in FIG. 6. Different cross section shapes which fulfill this condition are also possible, for example rounded shapes.

In FIG. 2a the configuration of the actuating element 1 (without the ram 8) is represented in a sectional view. FIG. 3 shows a plan view. It can be recognized that the armature 3 is configured as an annular part of the actuating element 1. The support element 4 is arranged to be disposed radially inside with reference to the armature 3. For constructional reasons, the support element 4 is configured of two parts here. In particular, by the beveled side of the support element 4 disposed radially outside and the correspondingly beveled shape of the armature 3, the armature 3 can be held simply without additional attachment means.

As represented in FIGS. 2a and 3, the weight of the support element 4 is further reduced by providing openings 12 and radial recesses 18 and axial recesses 17. In the plan view, the rim-type design of the support element 4 can be recognized with its spoke-like bars 11, which connect a part 19 disposed radially outside with a part 20 disposed radially inside. The part 19 disposed radially outside supports the armature 3, while the part 20 disposed radially inside supports the ram 8. Other shapes of the support element 4, in particular of the openings and recesses, are possible and can be chosen in dependence of the load to be supported and the material utilized. It is also possible not to provide openings and/or recesses. The armature 3 takes up only a small part of the actuating element 1. For example the armature 3 can take up less than 20%, preferably less than 10%, of the total diameter of the actuating element 1. For example the armature 3 can have an outside diameter of 47.4 mm and an inside diameter of 39.0 mm, such that the armature 3 has a wall strength of only 4.2 mm.

In an alternative exemplary embodiment represented in FIG. 2b, for which the above-said is otherwise applicable likewise, the support element 4' is formed by two deep-drawn parts. Two identical deep-drawn parts 4' are provided which face each other. Between the two parts the armature 3' is arranged, analogously to the two-part construction of the support element 4 represented in FIG. 2a.

In order to make possible a fluid exchange in axial direction and also to further economize weight, axial openings 12' are provided. These are provided in both parts of the support element 4', wherein the parts of the support element 4' are so mutually oriented that the openings 12' of the two parts are congruent. Further, also the central bore 9 in the support element 4' wherein the ram 8 is held is formed by deep drawing. The manufacture of the support element 4' in the deep-drawing technology is particularly simple and cost-effective.

The invention claimed is:

1. A linear actuator, comprising:
   a stator with a coil that can be fed with electric current for generating an electromagnetic field, and an actuating element mounted in axially movable fashion with reference to the stator, the actuating element having an armature and a ram extending in an axial direction, wherein the actuating element is mounted in the stator by at least one spring element such that it can be moved axially in frictionless fashion when the coil is fed with current,
   wherein the actuating element has a support element extending in a radial direction between the armature and the ram, wherein the support element comprises a non-magnetic material of a lower density than the armature,
   wherein the support element has openings axially extending therethrough, or
   wherein the support element has a first part disposed radially outside that supports the armature, and a second part disposed radially inside that supports the ram, said first part and second part being mutually connected by spoke-like bars.

2. The linear actuator according to claim 1, wherein the armature and the support element are dimensioned and adapted such that an enlargement of the armature in the radial direction towards the inside substantially does not effect an increase of the magnetic force that is generated by the electromagnetic field during operation and acts on the actuating element.

3. The linear actuator according to claim 1, wherein the armature is of annular configuration and surrounds the support element.

4. The linear actuator according to claim 3, wherein the ratio of the outside diameter of the armature to the inside diameter of the armature amounts to 2:1 at most.

5. The linear actuator according to claim 1, wherein the cross section of the armature is tapered towards the inside in the radial direction.

6. The linear actuator according to claim 1, wherein the support element comprises aluminum, magnesium, plastic and a fiber composite.

7. The linear actuator according to claim 1, wherein the actuating element comprises at least one permanent magnet which adjoins the armature and is arranged on the outside circumference of the armature.

8. The linear actuator according to claim 7, wherein two permanent magnets are provided which are spaced apart in the axial direction.

9. The linear actuator according to claim 1, wherein the support element has a smaller dimension than the armature at least regionally in the axial direction.

10. The linear actuator according to claim 1, wherein the support element comprises at least one deep-drawn part.

11. The linear actuator according to claim 1, wherein the actuating element is coupled to the stator on opposing axial sides of the armature respectively via at least one spring element such that the actuating element is oriented radially with reference to the stator by means of the spring elements.

12. The linear actuator according to claim 11, wherein the spring elements are flat in the stress-free state and extend in a plane perpendicular to the movement direction of the actuating element.

13. The linear actuator according to claim 11, wherein the spring elements are separated from a sheet-shaped material.

14. The linear actuator according to claim 11, wherein the spring elements are punched out of a sheet-shaped material.

15. An engine mount for an engine of a vehicle, comprising:
at least one linear actuator, comprising:
a stator with a coil that can be fed with electric current for generating an electromagnetic field, and an actuating element mounted in axially movable fashion with reference to the stator, the actuating element having an armature and a ram extending in an axial direction, wherein the actuating element is mounted in the stator by at least one spring element such that it can be moved axially in frictionless fashion when the coil is fed with current,
wherein the actuating element has a support element extending in a radial direction between the armature and the ram, wherein the support element comprises a non-magnetic material of a lower density than the armature,
wherein the support element has openings axially extending therethrough, or
wherein the support element has a part disposed radially outside that supports the armature, and a part disposed radially inside that supports the ram, said parts being mutually connected by spoke-like bars; and
a control for the linear actuator, wherein the control is adapted to counteract vibrations of the engine mount by suitably controlling the linear actuator.

* * * * *